(12) United States Patent
Kawase et al.

(10) Patent No.: US 7,194,509 B2
(45) Date of Patent: *Mar. 20, 2007

(54) METHOD AND SYSTEM FOR CHANGING A COLLABORATING CLIENT BEHAVIOR ACCORDING TO CONTEXT

(75) Inventors: Satoshi Kawase, Machida (JP); Akira Ohkado, Yokohama (JP); Yoichi Yoshida, Machida (JP)

(73) Assignee: International Business Machines Corporation, Armonk, NY (US)

( * ) Notice: Subject to any disclaimer, the term of this patent is extended or adjusted under 35 U.S.C. 154(b) by 341 days.

This patent is subject to a terminal disclaimer.

(21) Appl. No.: 10/615,164

(22) Filed: Jul. 8, 2003

(65) Prior Publication Data

US 2004/0024815 A1 Feb. 5, 2004

Related U.S. Application Data

(62) Division of application No. 09/578,107, filed on May 24, 2000, now Pat. No. 7,051,068.

(30) Foreign Application Priority Data

Jun. 16, 1999 (JP) .................................. 11-170197

(51) Int. Cl.
  G06F 15/16 (2006.01)
  G06F 15/00 (2006.01)
  G06F 17/00 (2006.01)
  G06F 17/21 (2006.01)
  G06F 17/24 (2006.01)

(52) U.S. Cl. ...................................... 709/203; 715/523
(58) Field of Classification Search ........ 709/201–224, 709/227–229; 715/505, 523, 530, 531, 760, 715/864, 866, 708
See application file for complete search history.

(56) References Cited

U.S. PATENT DOCUMENTS 5,367,619 A 11/1994 Dipaolo et al. .............. 395/149
5,778,402 A * 7/1998 Gipson ....................... 715/530

(Continued)

*Primary Examiner*—David Wiley
*Assistant Examiner*—David England
(74) *Attorney, Agent, or Firm*—Yee & Associates

(57) ABSTRACT

A collaboration client's behavior is changed according to context while collaborating on an internet. An HTTP request from a customer-side browser is sent to a web server via an information terminal support server. The web server then sends context in response to the request to the customer-side web browser via the information terminal support server. The information terminal support server then checks the contents of the context, and when it is determined that there is agreement with a predetermined condition, a command is inserted into the context. Context without the command inserted is sent to the customer-side web browser, and context with the command inserted is sent to the agent-side web browser. A client program of the agent-side information terminal then reads the embedded command using an API possessed by a web browser and carries out processing in order to prohibit form submission and form alteration and conceal specific forms or fields in accordance with the contents of this command.

5 Claims, 4 Drawing Sheets

U.S. PATENT DOCUMENTS

| | | | |
|---|---|---|---|
| 5,781,901 A * | 7/1998 | Kuzma | 707/10 |
| 5,835,923 A | 11/1998 | Shibata et al. | 705/526 |
| 5,892,510 A | 4/1999 | Lau et al. | 345/333 |
| 5,903,723 A * | 5/1999 | Beck et al. | 709/200 |
| 5,966,718 A | 10/1999 | Shibata | 707/530 |
| 5,978,828 A | 11/1999 | Greer et al. | 709/2.24 |
| 5,991,410 A | 11/1999 | Albert et al. | 380/24 |
| 6,029,182 A | 2/2000 | Nehab et al. | |
| 6,047,327 A | 4/2000 | Tso et al. | 709/232 |
| 6,058,391 A * | 5/2000 | Gardner | 707/4 |
| 6,073,137 A * | 6/2000 | Brown et al. | 707/104.1 |
| 6,098,081 A * | 8/2000 | Heidorn et al. | 715/501.1 |
| 6,144,991 A * | 11/2000 | England | 709/205 |
| 6,192,396 B1 * | 2/2001 | Kohler | 709/206 |
| 6,295,551 B1 * | 9/2001 | Roberts et al. | 709/205 |
| 6,298,356 B1 * | 10/2001 | Jawahar et al. | 707/201 |
| 6,300,948 B1 | 10/2001 | Geller et al. | 345/333 |
| 6,353,851 B1 * | 3/2002 | Anupam et al. | 709/204 |
| 6,389,511 B1 * | 5/2002 | Kedem | 711/114 |
| 6,393,526 B1 * | 5/2002 | Crow et al. | 711/137 |
| 6,487,195 B1 * | 11/2002 | Choung et al. | 370/352 |
| 6,490,601 B1 | 12/2002 | Markus et al. | 707/507 |
| 6,564,261 B1 * | 5/2003 | Gudjonsson et al. | 709/227 |
| 6,611,358 B1 | 8/2003 | Narayanaswamy | 358/442 |
| 6,675,216 B1 * | 1/2004 | Quatrano et al. | 709/229 |
| 6,691,281 B1 * | 2/2004 | Sorge et al. | 715/503 |
| 6,697,844 B1 * | 2/2004 | Chan et al. | 709/206 |
| 6,718,329 B1 | 4/2004 | Selvin et al. | 707/10 |
| 6,718,368 B1 | 4/2004 | Ayyadurai | 709/206 |
| 6,799,301 B1 * | 9/2004 | Francis et al. | 715/523 |
| 6,816,887 B1 * | 11/2004 | Shaw et al. | 709/207 |
| 7,010,571 B1 * | 3/2006 | Quatrano et al. | 709/205 |
| 2002/0023114 A1 | 2/2002 | Ito | |

\* cited by examiner

FIG. 4
CscHTMLRuleHndlr=/usr/lpp/ibmcf/lib/csmplhdr.so
FIG. 5
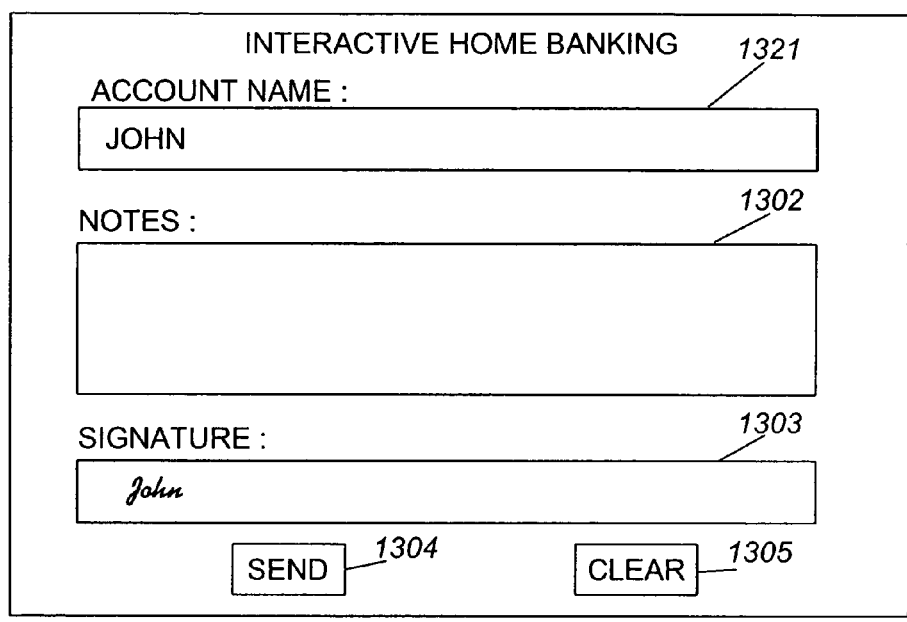
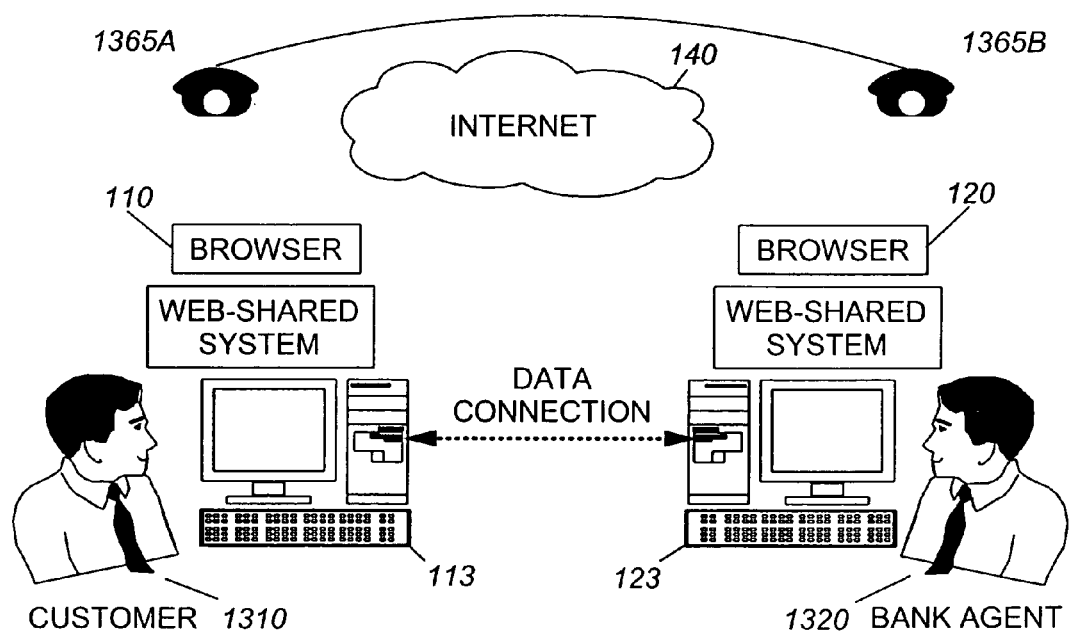

METHOD AND SYSTEM FOR CHANGING A COLLABORATING CLIENT BEHAVIOR ACCORDING TO CONTEXT

FIELD OF THE INVENTION

The present invention is a divisional of commonly assigned Ser. No. 09/578,107, now U.S. Pat. No. 7,051,068, filed on May 24, 2000, which is entitled "Method and System for Changing a Collaborating Client Behavior According to Context" and is incorporated herein by reference.

BACKGROUND OF THE INVENTION

Collaboration technology in which cooperative work (reading, moving, and changing) of an HTML page can be carried out simultaneously by a number of users is shown in Japanese Patent Laid-open Publication Hei. 10-124461. FIG. 5 herein shows an example of an HTML page cooperatively working as applied to an internet banking system. A bank agent and an internet customer consultation center agent etc. can then refer to and operate on the same page as the customer by employing this technology.

With specific HTML documents such as, for example, a screen for ordering a product, or a screen for designating a destination for a money transfer, there are situations in which an agent should not be able to submit an HTML form or change data input to an HTML form. Collaboration servers were, however, originally provided in order to distribute the same HTML content between collaborating browsers. There is therefore no way for collaborating clients to know when and how such behavior has changed.

SUMMARY OF THE INVENTION

It is an object of the present invention to provide a collaboration system capable of changing collaborating client behavior according to context during internet based collaboration.

It is a further object of the present invention to provide a system where an administrator can intentionally change the content requested by a client.

It is another object of the present invention to provide a low-cost collaboration system where resources required while supporting an information terminal are reduced.

It is a further object of the present invention to provide a collaboration system where centralized control is possible during information terminal support.

It is another object of the present invention to provide a collaboration system that is not dependent on the platform of the information terminal operated.

It is a further object of the present invention to provide a collaboration control system capable of controlling the contents of a service provided to an information terminal without changing a server responding to a request from the information terminal.

In the present invention, an HTTP request from a customer-side browser is sent to a web server via an information terminal support server. The web server then sends context in response to the request to the customer-side web browser via the information terminal support server. At this time, the information terminal support server checks the contents of the context, and when it is determined that there is agreement with a predetermined condition, a command is inserted into the context. Context without the command inserted is sent to the customer-side web browser, and context with the command inserted is sent to the agent-side web browser. The client program of the agent-side information terminal then reads the embedded command via a web browser API and carries out processing in order to prohibit form submission and form alteration and conceal specific forms or fields in accordance with the contents of this command.

In an aspect of the present invention, there is provided an information processing method in an information processing system having an information terminal support server which supports collaboration of a browser loaded on a customer-side information terminal and a browser loaded on an agent-side information terminal. The method comprising the steps of:

(a) receiving, at the information terminal support server, an HTTP message sent in response to a customer-side browser request;

(b) determining whether or not the HTTP message agrees with a predetermined condition;

(c) editing contents of the HTTP message when the HTTP message agrees with the predetermined condition;

(d) sending the unedited HTTP message to the customer-side browser; and (e) sending the edited HTTP message to the agent-side browser.

In the scope of the patent claims of this application, "information terminal support server" is a concept that includes collaboration servers and proxy servers.

In a further aspect of the present invention there is provided an information processing method wherein, in the step (c) above, editing is carried out to insert a command for the client program loaded on the agent-side information terminal. In the scope of the patent claims of this application, "command" is a concept that includes commands instructing processing that can be carried out by browser-specific APIs.

In another aspect of the present invention there is provided an information processing method, wherein the command is one of "form submit prohibition", "form alteration prohibition", "concealment of specific form" or "concealment of specific field".

In a further aspect of the present invention there is provided an information processing method in an information processing system having an information terminal support server which supports an information terminal connected to a content server and loaded with a client program, the method comprising the steps of:

(a) receiving, at the information terminal support server, a message sent from the content server responding to a request from the information terminal;

(b) determining whether or not the message agrees with a predetermined condition;

(c) editing the message to insert a command for the client program when the message agrees with the predetermined condition; and (d) sending the edited message to the information terminal.

In the scope of the patent claims of this application, "content server" refers to servers such as web servers etc. that send content to the client-side in response to requests from a client.

In a still further aspect of the present invention there is provided an information terminal support server which supports collaboration of a browser loaded on a customer-side information terminal and a browser loaded on an agent-side information terminal, the information support server comprising:

(a) a rule definition part including a condition setting part and a command setting part;

(b) a rule control manager for monitoring, at the information support server, HTTP messages sent in response to customer-side browser requests;

(c) an HTTP checker, determining whether or not the HTTP message agrees with a condition of the condition setting part of the rule definition part;

(d) an HTTP editor, editing contents of the HTTP message according to contents of the command setting part of the rule definition part, when the HTTP message agrees with a predetermined condition;

(e) customer cache storing the unedited HTTP message sent to the customer-side browser; and (f) agent cache storing the edited HTTP message sent to the agent-side browser.

In another aspect of the present invention there is provided an information terminal support server, wherein the HTTP editor carries out editing to insert a command for the client program loaded on the agent-side information terminal.

In a further aspect of the present invention there is provided an information terminal support server, wherein the command is one of "form submit prohibition", "form alteration prohibition", "concealment of specific form" or "concealment of specific field".

In another aspect of the present invention there is provided an information terminal support server which supports an information terminal connected to a content server and loaded with a client program, the information terminal support server comprising:

(a) a message checker for determining whether or not a message sent from a content server in response to a request from the information terminal agrees with a predetermined condition; and (b) a message editor, editing the message to insert a command instructing the client program when the message agrees with the predetermined condition.

In a still further aspect of the present invention there is provided a collaboration system supporting collaboration of a browser loaded on a customer-side information terminal and a browser loaded on an agent-side information terminal, the collaboration system comprising:

(a) an agent-side information terminal collaborating with the customer-side information terminal;

(b1) a rule definition part including a condition setting part and a command setting part;

(b2) a rule control manager for monitoring an HTTP message sent in response to customer-side browser requests;

(b3) an HTTP checker determining whether or not the HTTP message agrees with a condition of the condition setting part of the rule definition part;

(b4) an HTTP editor, editing contents of the HTTP message according to contents of the command setting part of the rule definition part, when the HTTP message agrees with a predetermined condition;

(b5) customer cache storing the unedited HTTP message sent to the customer-side browser; and (b6) an information terminal support server having agent cache storing the edited HTTP message sent to the agent-side browser.

In another aspect of the present invention there is provided a recording medium storing an information processing program executed within a system having an information terminal support server supporting collaboration of a browser loaded on a customer-side information terminal and a browser loaded on an agent-side information terminal, the program comprising:

(a) program code instructing the information terminal support server to receive an HTTP message sent in response to a request of the customer-side browser;

(b) program code instructing the information terminal support server to determine whether or not the HTTP message agrees with a predetermined condition;

(c) program code instructing the information terminal support server to edit the HTTP message contents when the HTTP message agrees with the predetermined condition;

(d) program code instructing the information terminal support server to send the unedited HTTP message to the customer-side browser; and (e) program code instructing the information terminal support server to send the edited HTTP message to the agent-side browser.

In a further aspect of the present invention there is provided a recording medium, wherein editing is carried out to insert a command into the client program loaded on said agent-side information terminal.

In a still further aspect of the present invention there is provided a recording medium, wherein the command is one of "form submit prohibition", "form alteration prohibition", "concealment of specific form" or "concealment of specific field".

In another aspect of the present invention there is provided a recording medium storing an information processing program executed within a system having an information terminal support server which supports an information terminal connected to a content server and loaded with a client program, the program comprising:

(a) program code instructing the information terminal support server to receive a message sent from the content server in response to a request from the information terminal;

(b) program code instructing the information terminal support server to determine whether or not the message agrees with a predetermined condition;

(c) program code instructing the information terminal support server to edit the message to insert a command providing instructions to the client program when the message agrees with the predetermined condition; and (d) program code instructing the information terminal server of sending of the edited message to the information terminal.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 4 is a conceptual view of the configuration file of the preferred embodiment of the present invention; and FIG. 5 is a view illustrating related collaboration technology.

DETAILED DESCRIPTION OF THE INVENTION

A. Hardware Configuration

Figure 1:
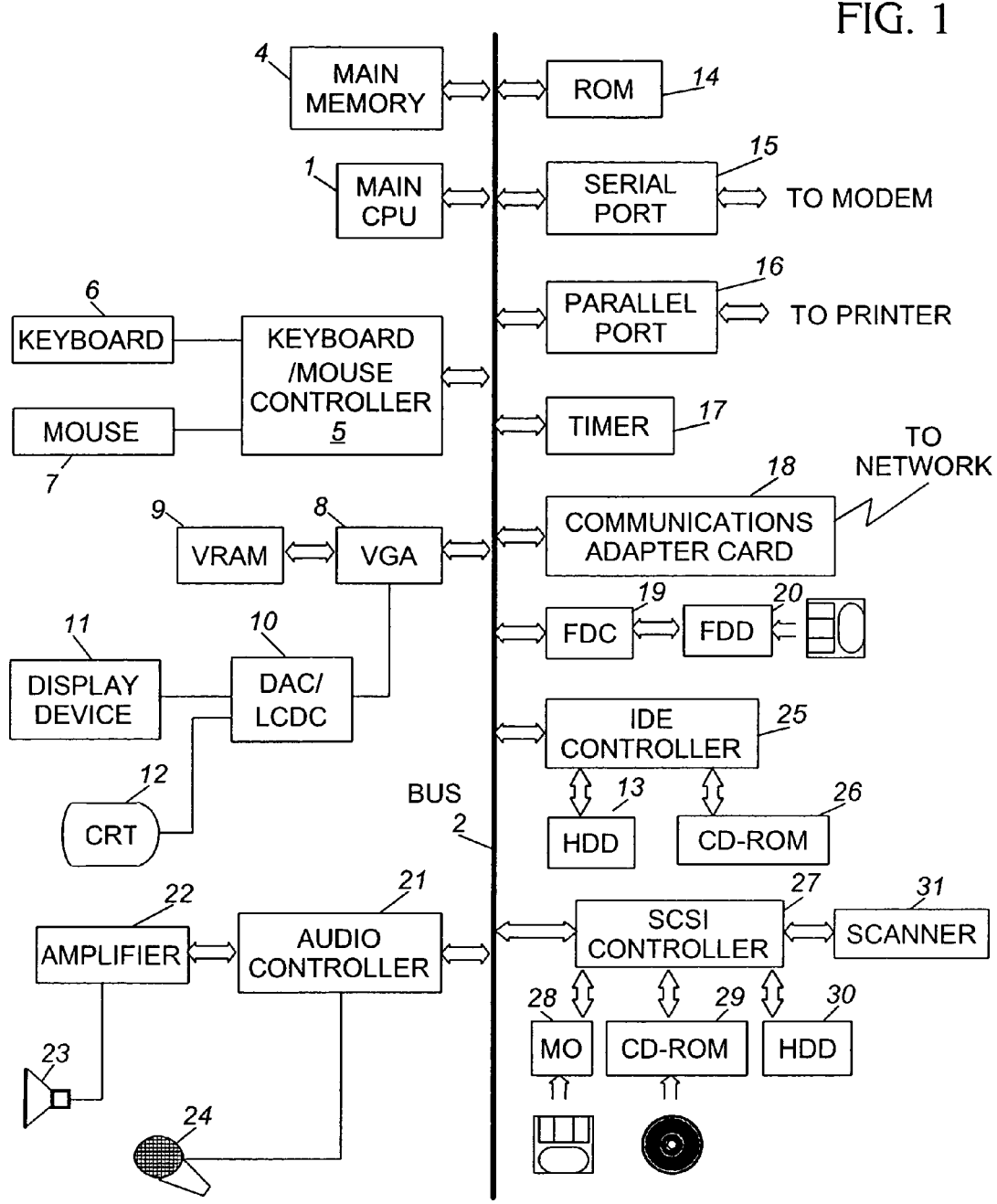
FIG. 1 is a block diagram showing an embodiment of an information terminal support server or information terminal hardware configuration of the present invention.

FIG. 1 is an outline view showing an embodiment of a hardware configuration for an information terminal support server 110 (See FIG. 2) used in the present invention. The information terminal support server 110 includes a Central Processing Unit (CPU) 1 and a memory 4. The CPU 1 and the memory 4 are connected to an auxiliary storage device that is a hard disc 13 via a bus 2. A floppy disc device (or a recording medium driver 26, 28 or 29 such as an MO or CD-ROM, etc.) 20 is connected to the bus 2 via a floppy disc controller 19 (or IDE controller 25 or SCSI controller 27 etc.).

A floppy disc (or recording medium such as an MO or CD-ROM) is inserted into the floppy disc device (or recording medium driver such as an MO or CD-ROM, etc.) 20. This floppy disc etc., hard disc device 13 or ROM 14 can then be loaded with code for a computer program, that provides instructions to the CPU 1 etc. in unison with the operating system so as to execute the present invention. This program is loaded into the memory 4 for execution. The code for this computer program can be compressed or can be recorded distributed between a plurality of mediums.

The information terminal support server 110 is equipped with user interface hardware that can comprise a pointing device (mouse, joystick, etc.) 7 or a keyboard 6 for the input of data, and a display device 11 for presenting the user with visual data. The input means can also be a touch panel. It is also possible to connect a printer via a parallel port 16 or connect a modem via a serial port 15. The information terminal support server 110 is connected to a network via the serial port 15 and the modem or a communications adapter card 18 (Ethernet or token ring card) etc. and is capable of communicating with other computers.

A speaker 23 receives an audio signal, D/A converted (Digital to Analog-converted) by an audio controller 21, via an amplifier 22 and outputs this signal as audio. An audio controller 21 A/D (Analog to Digital) converts audio information received from a microphone 24 so that audio information from outside the system can be taken in by the system.

It can be easily understood that the information terminal support server 110 can be an information terminal having a communications function including one or a combination of a typical personal computer (PC), workstation, notebook PC, palmtop PC, or network computer, etc. Such elements of the configuration are, however, only shown as an example, and all of these elements of the configuration are not elements of the configuration essential to the present invention.

In particular, in the hardware configuration described here, the audio controller 21, amplifier 22, speaker 23 and microphone 24 required for processing audio, the keyboard 6, mouse 7 and keyboard/mouse controller 5 enabling direct input from an operator, the CRT 12, display device 11, VRAM 9, and VGA 8 for presenting visual data to the user, and each of the recording medium processors 19, 25 and 27, etc. are not essential to the support of the information terminal and may be omitted.

Various modifications such as combining each element of the configuration of the information terminal support server 110 over a number of machines and then executing these functions in a distributed manner can easily be assumed by one skilled in the art and such concepts are considered to be included in the spirit and scope of the present invention.

An agent information terminal 130 (See FIG. 2) used in the present invention can also be realized, as with the information terminal support server 110, by the hardware configuration shown in FIG. 1, i.e. the information terminal 130 can also enable input of information requests and can issue and receive such requests. It can, therefore, be easily understood that the information terminal 130 can be realized by one or a combination of a typical personal computer (PC), a notebook PC, palmtop PC, various household products such as a television with a computer built-in, game machines having communications functions, or information terminals having communications functions including a telephone, FAX, portable telephone, Personal Handy System (PHS) or electronic notebook, etc. However, these elements of the configuration are shown as an example, and all of these elements of the configuration are by no means essential to the present invention.

The operating system on the side of the information terminal support server 110 is by no means limited to a specific operating system environment, and can be an operating system supporting a GUI multi-window environment as standard, such as Windows NT (trademark of Microsoft), Windows 9x (trademark of Microsoft), Windows 3.x (trademark of Microsoft), OS/2 (trademark of IBM), MacOS (trademark of Apple), Linux (trademark of Linus Torvalds), or the X-WINDOW system (trademark of MIT) on AIX (trademark of IBM), a character-based environment such as PC-DOS (trademark of IBM) or MS-DOS (trademark of Microsoft), a real time OS such as VxWorks (trademark of Wind River Systems, Inc.), or an operating system such as Java OS, etc., incorporated in a network computer.

The operating system on the side of the information terminal 130 is also by no means limited to a specific operating system environment, and can be an operating system supporting a GUI multi-window environment as standard, such as Windows NT (trademark of Microsoft), Windows 9x (trademark of Microsoft), Windows 3.x (trademark of Microsoft), OS/2 (trademark of IBM), MacOS (trademark of Apple), Linux (trademark of Linus Torvalds), or the X-WINDOW system (trademark of MIT) on AIX (trademark of IBM), a character-based environment such as PC-DOS (trademark of IBM) or MS-DOS (trademark of Microsoft), a real time OS such as VxWorks (trademark of Wind River Systems, Inc.), or an operating system such as Java OS, etc., incorporated in a network computer.

B. System Configuration.

Figure 2:
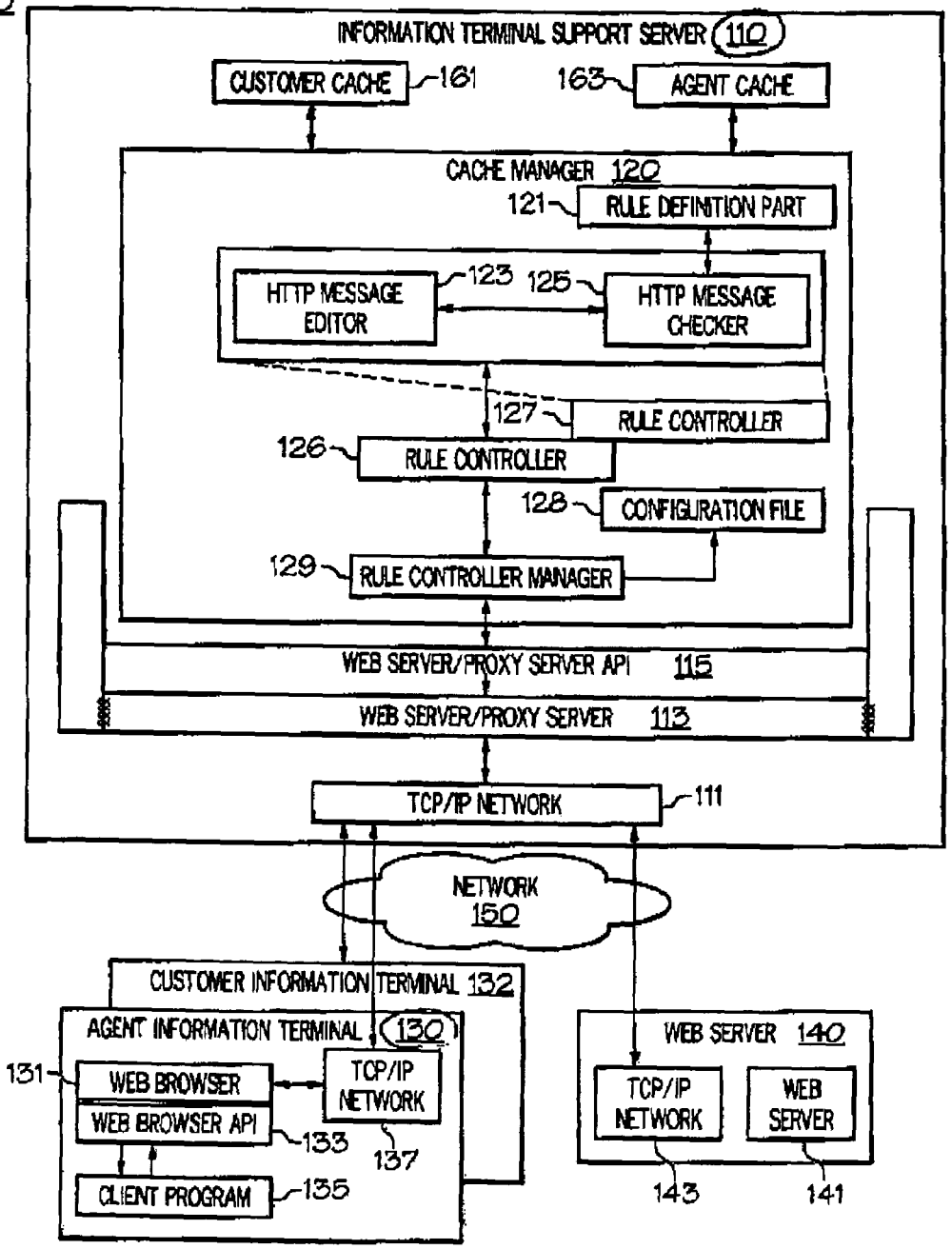
FIG. 2 is a block diagram of the processing elements of the preferred embodiment of the present invention.

FIG. 2 is a functional block diagram showing a system configuration of a collaboration system including the information terminal support server 110 of the preferred embodiment of the present invention.

A collaboration system 100 of the preferred embodiment of the present invention includes information terminals 130 and 132, an information terminal support server 110 and a web server 140.

In the preferred embodiment of the present invention, a web browser 131 is installed on the information terminals 130 and 132. The web browser 131 designates a URL and sends a request to go to a predetermined web server. The web browser 131 then receives a response sent from the web server 140 for displaying on the display screen. A client program 135 is installed on the agent information terminal 130. The client program 135 reads HTML content loaded at the web browser 131 via a web browser API 133 and executes commands carried out by a cache manager on the proxy server via the web browser API 133 and an OS API.

The information terminal support server 110 of the preferred embodiment of the present invention is equipped with a web server/proxy server 113, a web server/proxy server API 115, and a cache manager 120.

The cache manager 120 caches HTML contents (HTTP responses) for HTTP requests sent by the web browsers 131. When the two web browsers are shared, the cache manager 120 controls returning of the same HTML data in accordance with HTTP requests sent in an interactive manner. In the preferred embodiment of the present invention, the cache manager 120 is written using the proxy server or web server/proxy server API 115 so that all HTTP messages can be monitored using the proxy server or web server 113. HTTP messages handled and monitored by a rule control manager 129 are sent to the rule control manager 129, which is entrusted with the processing of these HTTP messages.

The rule control manager 129 delivers HTTP messages sent from the web server/proxy server 113 to rule controllers 126 and 127 designated by a configuration file 128 and is entrusted with the processing of these HTTP messages. The rule control manager 129 can designate a plurality of configuration files 128 and can call the rule controllers 126 and 127 in a designated order.

The rule controllers 126 and 127 comprise a HTTP message checker 125 and a HTTP message editor 123. The HTTP message checker 125 refers to a rule definition part 121 and determines whether or not to edit an HTTP message. When it is determined to edit a message, this HTTP message is sent to the HTTP message editor 123. The HTTP message editor 123 then edits the HTTP message according to the contents of the rule definition part 121, stores the edited message in an agent cache 163, and the results of editing are returned to the rule control manager 129. When it is determined not to edit a message, this message is returned to the rule control manager 129 as is. The rule definition part 121 comprises a condition setting part and a command setting part, and defines under what conditions and in what manner HTTP messages are to be edited.

Each functional block shown in FIG. 2 is described above but these functional blocks are logical functional blocks. This does not necessarily mean that these functional blocks each have to be individually realized by hardware and software, and the functional blocks may be realized by combinations of hardware and software or by shared hardware and software. It also goes without saying that all of the functional blocks shown in FIG. 2 are not essential elements of the configuration of the present invention.

C. Operating Procedure.

Figure 3:
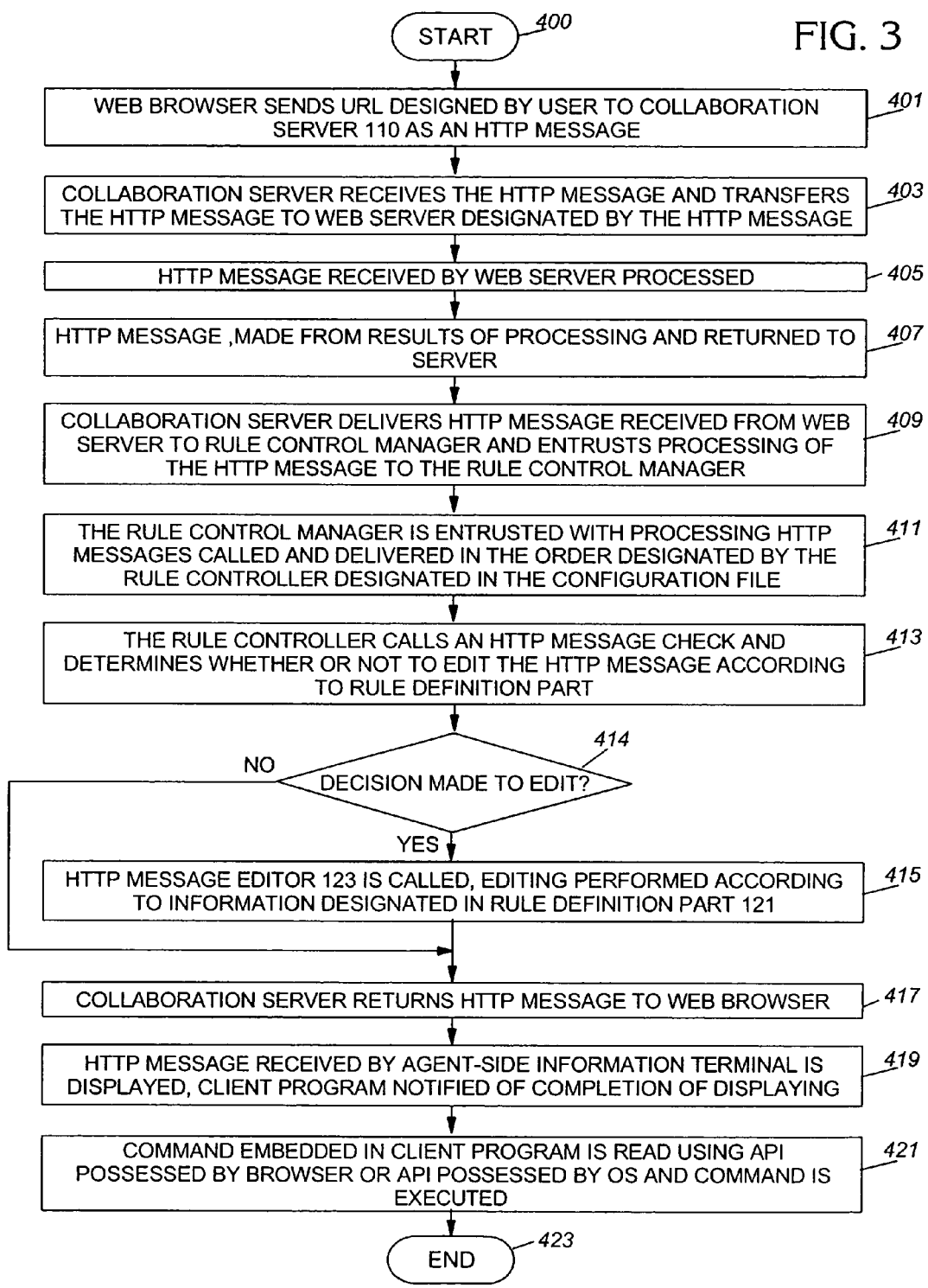
FIG. 3 is a flowchart showing the operating procedure for the information terminal support system of the preferred embodiment of the present invention.

FIG. 3 is a flowchart showing the operation of the information processing terminal support system 100 of the preferred embodiment of the present invention. This procedure starts from step 400. At this time, the agent-side information terminal 130 and the web browser 131 of the customer information terminal 132 are connected to the information terminal support server 110.

In the preferred embodiment of the present invention, when the web browser 131 of the customer information terminal 132 makes a request to the web server on the collaboration server for a specific URL, a customer-specific UAI (customer identification information) is generated on the information terminal support server 110 and this is set as a Cookie at the HTTP response header and sent to the customer-side web browser.

On the agent side, the collaboration software is started up, and the collaboration server can recognize that the web browser 131 having an agent-specific ID is connected from the registration of a user ID and password. A cookie command is then included in all HTTP request headers generated thereafter. As a result, UAI information uniquely identifying the customer-side browser and the presence of an agent can be generated. The customer and a corresponding agent are managed by an agent management table and are made to correspond to each other. This technology is well known and details thereof are, therefore, omitted.

In this initial condition, the web browser 131 of the customer information terminal 132 makes the URL designated by the user an HTTP message and sends this HTTP message to the information terminal support server 110 (step 401). The information terminal support server 110 receives this HTTP message (step 403), and transfers the HTTP message to the to a web server 140 designated by the HTTP message. The HTTP message is transferred to a web server designated in a configuration file in the case of a collaboration server.

The web server 140 then processes the received HTTP message (step 405), and a new HTTP message is generated and returned to the information terminal support server 110 (step 407).

The information terminal support server 110 stores the HTTP message received from the web server 140 in the customer cache 161, and delivers the HTTP message to the rule control manager 129, which is entrusted with processing the HTTP message (step 409). The rule control manager 129 is responsible for processing HTTP messages called and sent in the order requested by the rule controllers 126 and 127 designated by the configuration file 128 (step 411). A plurality of rule controllers of the format shown in FIG. 4 can be designated in the configuration file.

The rule controllers 126 and 127 themselves are Shared Objects (in Unix) or Dynamic Link Libraries (in Windows) data. In the preferred embodiment of the present invention, this programming interface is decided as follows.

TABLE 1

```
int CscPluginCInit (const char *pszConf)
This function is called when CacheManager is started via
CscPlhdrInit 0.
argument
        const char                                    : path of HTML plugin
configuration file
return value
        0                                             : OK
        4900-4999 : error
int CscPluginCConv ( const CsmConvParam param,
        const char      *pIn,
        const int       isize,
        char            **ppOut,
        int             *osize )
```

TABLE 1-continued

```
This function is called to convert an HTML content via
CscPlhdrConv0.
argument
    const CsmConvParam          : information for conversion
    const char *pIn             : input content
    const int isize             : size of input content
    char        **ppOut         : output content
    int         *osize          : size of output content
return value
    0    : OK
    4900-4999 : error
void CsmPluginCFree ( char *p)
This function is called to free ppOut of CscPluginCConv( ) via
CscPlhdrFree0.
argument
    char *                      : ppOut of CscPluginCConv( )
return value
    None
int CscPluginCTerminate ( )
This function is called when CacheManager is stopped via
CscPlhdrdrTerminate ( ).
argument
    None
return value
    0                           : OK
    4900-4999 : error
```

The rule controllers 126 and 127 comprise the HTTP message checker 125 and the HTTP message editor 123, call the HTTP message check when an HTTP message is sent from the rule control manager 129, and determine whether or not to edit this HTTP message in accordance with the rule definition part 121 (step 413).

The rule definition part is designated using the following format. In this example, the rule definition part comprises a condition setting part and a command setting part. The rule definition part is set to URL=<url name> and the HTTP message checker 125 determines whether or not the HTTP message agrees with this condition. In this example a command inhibiting a predetermined operation with respect to a predetermined URL is designated, but the HTTP message can be analyzed and a condition to determine at the HTTP checker 125 whether or not there is agreement with a predetermined condition (for example, the presence of a send button, an input field, or predetermined violent or obscene characters or images) can be set.

```
    URL=<url
name>;AgentActionProhibited=<command>[<command>. . .]
        <command>=<submit |
            alterform |
        notshown: [formname=<formname>,
            fieldname=<fieldname>[,<fieldname>. . .]
    >;
```

In this example, form submission, form alterations, and concealment of specific forms or fields are designated. When it is determined by the HTTP message checker 125 that an alteration is required, the data in the customer cache 161 is copied to the agent cache 163. The HTTP message editor 123 is then called, and editing is carried out according to the information contained in the rule definition part 121 (step 415).

In the preferred embodiment of the present invention, the HTTP message editor 123 embeds the following commands in the HTTP message in the agent cache 163.

```
<!--#CP__WebC__AgentActionProhibited=<command>[<command>. . .]
-->
    <command>=<submit |
        alterform |
    notshown: [formname=<formname>;]
        fieldname=<fieldname>[,<fieldname>. . .]
    >;
```

The information terminal support server 110 then sends a reply to the HTTP message to the web browser 131 (step 417). At this time, the HTTP message in the customer cache 161 is sent to the web browser 131 of the customer information terminal 132 and the HTTP message in the agent cache 163 is sent to the web browser 131 of the agent information terminal 130.

The web browser 131 of the agent-side information terminal 130 displays the received HTTP message and notifies the client program 135 that this has been done (step 419). Specifically, the client program 135 acquires an end of displaying event for the web browser 131.

The client program 135 reads the embedded command using an API possessed by the web browser and then executes this command (step 421). In this example, the client program 135 instructs, using an API possessed by the web browser or the OS, prohibition of submission and form alteration, and concealment of specific forms and fields. In the preferred embodiment of the present invention, the following processing is carried out on the client side when the command is NOTSHOWN (non-displaying of predetermined information).

The field not displayed on the agent side is taken to be FieldA. When a customer inputs data in a certain field, the client program transfers the inputted data to the agent-side client as is, but when there is data inputted in FieldA, the same number of the symbols "*" are transferred rather than transferring the inputted data, to be stored at the agent side client with the symbols "*" in FieldA remaining as they are. An extremely high standard of security can therefore be maintained with this processing.

D. Others

In the above, a description is given of an example of the present invention applied to collaboration technology. However, in the present invention an HTTP message sent from the web server 140 is analyzed, and when there is agreement with a predetermined condition, this message is edited and sent to the client side. This technology can, therefore, also be applied to fields other than collaboration, such as Internet education, where, for example, a correct answer field may be masked until there is agreement with a predetermined condition. Further, in the preferred embodiment of the present invention, an example of an internet/intranet is described, but this technology can also be applied to communication systems employing protocols other than the Internet protocol. Still further, in the preferred embodiment of the present invention, context with a command inserted is sent to the agent-side web browser and this command is executed by the client program. However, it is also possible to send context with a command inserted to the customer-side web browser in order to inhibit the customer from carrying out predetermined operations and then have the client program execute this command, or have the command executed by both the customer and agent.

According to the present invention, a collaboration system is capable of changing the behavior of collaborating clients according to context during collaboration on an internet.

In one aspect of the present invention, a system is capable of changing content sent from a server in response to a request from a client according to the intentions of an administrator.

What is claimed:

1. An information terminal support server which supports collaboration of a browser loaded on a customer-side information terminal and a browser loaded on an agent-side information terminal, the information terminal support server comprising:

a rule definition part including a condition setting part and a command setting part;

a rule control manager for monitoring, at the information terminal support server, HTTP messages sent in response to customer-side browser requests;

an HTTP checker, determining whether or not said HTTP messages agree with a condition of said condition setting part of said rule definition part;

an HTTP editor, editing contents of said HTTP messages according to contents of said command setting part of said rule definition part, when said HTTP messages agree with a predetermined condition, wherein the editing contents of said HTTP messages includes embedding a command in said HTTP message, and wherein said browser on an agent-side information terminal displays said HTTP message by executing the command embedded in said HTTP message;

customer cache storing of said HTTP messages in an unedited form sent to the browser on the customer-side information terminal; and agent cache storing of said HTTP messages in an edited form sent to the browser on the agent-side information terminal.

2. The information terminal support server of claim 1, wherein said command is one of "form submit prohibition", "form alteration prohibition", "concealment of specific form" or "concealment of specific field".

3. A collaboration system supporting collaboration of a browser loaded on a customer-side information terminal and a browser loaded on an agent-side information terminal, the collaboration system comprising:

an agent-side information terminal collaborating with the customer-side information terminal;

a rule definition part including a condition setting part and a command setting part;

a rule control manager for monitoring an HTP message sent in response to customer-side browser requests;

an HTTP checker, determining whether or not said HTTP messages agree with a condition of said condition setting part of said rule definition part;

an HTTP editor, editing contents of said HTTP messages according to contents of said command setting part of said rule definition part, when said HTTP messages agree with a predetermined condition, wherein the editing contents of said HTTP messages includes embedding a command in said HTTP message, and wherein said browser on an agent-side information terminal displays said HTTP message by executing the command embedded in said HTTP message;

customer cache storing of said HTTP messages in an unedited form sent to the browser loaded on the customer-side information terminal; and an information terminal support server having agent cache for storing said HTTP messages in an edited form sent to the browser loaded on an agent-side information terminal.

4. A computer program product recorded on a computer readable media for collaborating support on an information terminal support server which supports a browser loaded on a customer-side information terminal and a browser loaded on an agent-side information terminal, comprising:

computer readable means for defining a rule part including a condition setting part and a command setting part;

computer readable means for monitoring with a rule control manager at the information terminal support server, HTTP messages sent in response to customer-side browser requests;

computer readable means for determining with an HTTP checker, whether or not said HTTP messages agree with a condition of said condition setting part of said rule definition part;

computer readable means for editing with an HTTP editor, contents of said HTTP messages according to contents of said command setting part, when said HTTP messages agree with a predetermined condition, wherein the editing contents of said HTTP messages includes embedding a command in said HTTP message, and wherein said browser on an agent-side information terminal displays said HTTP message by executing the command embedded in said HTTP message;

computer readable means for storing in a customer cache of said HTTP messages in an unedited form sent to the browser on the customer-side information terminal; and computer readable means for storing in an agent cache said HTTP messages in an edited form sent to the browser on the agent-side information terminal.

5. The computer program product of claim 4, wherein said command is one of "form submit prohibition", "form alteration prohibition", "concealment of specific form" or "concealment of specific field".

* * * * *